United States Patent [19]

Bonné et al.

[11] Patent Number: 5,267,769
[45] Date of Patent: Dec. 7, 1993

[54] MANUALLY OPERABLE FOLDING TOP FOR VEHICLES USING AUTOMATIC-EJECTION SNAP-ACTION CLOSURES

[75] Inventors: Andreas Bonné, Neukirch; Martin Guckel, Wiernsheim; Jürgen Schrader, Weil im Schönbuch; Klaus Claar, Gechingen all of Fed.

[73] Assignee: Mercedes-Benz AG, Fed. Rep. of Germany

[21] Appl. No.: 914,149

[22] Filed: Jul. 16, 1992

[30] Foreign Application Priority Data

Jul. 16, 1991 [DE] Fed. Rep. of Germany ....... 4123516

[51] Int. Cl.⁵ .......................................... B60J 7/185
[52] U.S. Cl. .................................. 296/107; 296/136; 296/116; 292/43; 292/201
[58] Field of Search ............... 296/107, 136, 116; 292/201, 216, 43

[56] References Cited

U.S. PATENT DOCUMENTS

| | | | |
|---|---|---|---|
| 2,747,928 | 5/1956 | Olivier et al. | 296/107 |
| 3,016,968 | 1/1962 | Lenz et al. | 292/201 X |
| 3,053,567 | 9/1962 | Geiger | 296/136 X |
| 3,504,511 | 4/1970 | Allen | 292/DIG. 43 X |
| 3,596,484 | 8/1971 | Peters | 292/DIG. 43 X |
| 3,664,698 | 5/1972 | Stropkay | 292/216 X |
| 3,857,001 | 12/1974 | Quantz | 292/216 X |
| 3,891,252 | 6/1975 | Lehmann | 296/136 X |
| 4,746,163 | 5/1988 | Muscat | 296/107 X |
| 4,976,477 | 12/1990 | Nakao | 292/DIG. 43 X |

FOREIGN PATENT DOCUMENTS

| | | |
|---|---|---|
| 2327487 | 4/1975 | Fed. Rep. of Germany . |
| 3708095 | 7/1988 | Fed. Rep. of Germany . |
| 3829288 | 4/1989 | Fed. Rep. of Germany . |
| 2142078 | 1/1985 | United Kingdom ............... 292/216 |

OTHER PUBLICATIONS

Research Disclosure, 2244, Aug. 1990, one page, Variable Force Pop-up Hood Latch.

*Primary Examiner*—David M. Mitchell
*Assistant Examiner*—Gary C. Hoge
*Attorney, Agent, or Firm*—Evenson, McKeown, Edwards & Lenahan

[57] ABSTRACT

A manually operable folding top for vehicles has a folded stowed position of the open top in a folding-top compartment covered by a folding-top compartment lid. In an unfolded use position of the closed top, the folding-top covering is stretched between a roof cap on the front end of the top and a fabric-holding hoop at the rear end of the top, A closure arrangement which can be unlocked, remote-controllably from the interior of the vehicle, comprises a plurality of closures, via which the folding-top compartment lid is held closed and the fabric-holding hoop is held down in the position in which it rests on the folding-top compartment lid. In order to obtain greater constructional freedom in the selection of the operating point, the closure arrangement has only automatic-ejection snap-action closures, each of which can be released via a motorized actuating drive. The actuating drives are activated via the actuation of a switch arrangement in order to release the closures.

9 Claims, 4 Drawing Sheets

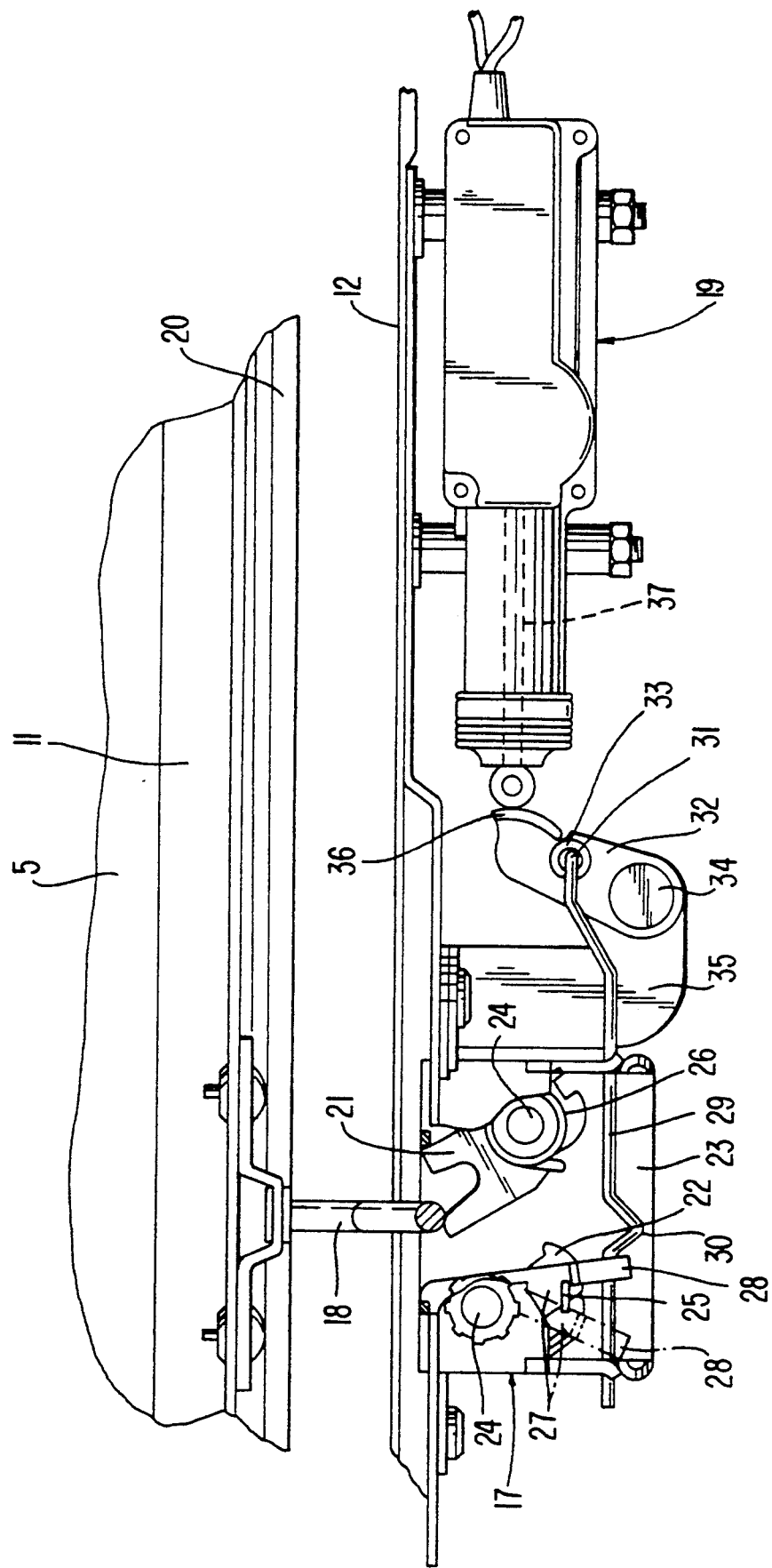

MANUALLY OPERABLE FOLDING TOP FOR VEHICLES USING AUTOMATIC-EJECTION SNAP-ACTION CLOSURES

BACKGROUND AND SUMMARY OF THE INVENTION

The present invention relates to a manually operable folding top for vehicles, and more particularly, to a top with a folded stowed position of the top in the folding-top compartment covered by the folding-top compartment lid and with an unfolded use position of the top in which the folding-top covering is stretched between a roof cap on a front end of the folding-top and a fabric-holding hoop at a rear end of the folding-top, and a closure arrangement comprising a plurality of closures configured to be unlocked with remote control from the vehicle interior and such that the folding-top compartment lid is held closed and the fabric-holding hoop is held down in the position in which it rests on the folding-top compartment lid.

One type of folding top is disclosed in German Patent No. 2,327,487, in which a crank is provided for the remote operation of the hook-type closures used. The crank is connected to the closures of the folding-top compartment lid and of the fabric-holding hoop via connecting rods or Bowden cables. The crank is arranged close to the folding-top compartment in the interior of the vehicle. This allows the closures to be unlocked from an operating point by turning the crank before getting out of the vehicle. This considerably simplifies the operating process when opening the folding top. It is also possible in an advantageous manner to dispense with external operating elements for unlocking the closures.

A disadvantage of the known folding top, however, resides in the fact that there is a considerable outlay for the construction of the hook-type closures themselves and also for the mechanical transmission system between the hand crank and the hook-type closures. In addition, due to the principle of their construction, the hook-type closures have a considerable overall height, especially in the swivelling plane of their closure hook, as a result of which they require a correspondingly deep installation space. If, for example, a recessed closure arrangement for locking the fabric-holding hoop in the folding-top compartment lid is provided, the space for such a deep installation space will hardly be available on the underside of the folding-top compartment lid.

Compact snap-action closures designed as pivoted-latch closures are furthermore used for locking the bonnet in the ranges of motor cars currently made by the assignee of the application, Mercedes-Benz AG. The box-shaped housing of these pivoted-latch closures, in which a forked pivoted latch and a pawl interacting with the latter are mounted, has an overall height of only about 40 mm and thus makes possible a space-saving arrangement of the closure. The snap-action closures, which are in each case used in pairs, are held in their release position by a spring force and can be moved into their locking position by simply pushing the bonnet shut. Their forked pivoted latches are blocked against swivelling in this position by the associated pawl. To unlock the bonnet, the pawls of the snap-action closures are swivelled synchronously out of their locking position. The snap-action closures thereby are released, and their forked pivoted latches snap back into their release position under the spring loading.

For the purpose of remote-controllable release of the closures, a Bowden cable arrangement is provided, via which a handle in the interior of the vehicle is connected to a lever arm of the pawls. The Bowden cable of the Bowden cable arrangement here passes through a narrow side wall of the closure housing, with the result that the overall height of the snap-action closure is not increased by the Bowden cable arrangement.

From the point of view of installation space, it would therefore be worth considering the use of such compact snap-action closures also with lowerable folding tops for the purpose of locking the folding-top compartment lid and the fabric-holding hoop on the folding-top compartment lid, especially since, due to the batch quantities, they can be manufactured relatively economically. However, a multi-element mechanical transmission system would also be necessary for this purpose and it would thus still be necessary to accept the cost of construction of a complex mechanical transmission system. Over and above the cost of construction, a mechanical transmission system between the operating element and the associated closures also quite considerably limits the freedom of the designer in the selection of a suitable operating point.

An object on which the present invention is based is to further provide a manually operable folding top such that space-saving compact closures can be used for the closure arrangement for locking the fabric-holding hoop and the folding-top compartment lid, for the purpose of obtaining, by virtue of a transmission system which is variable and hence economical, a considerable degree of freedom for the engineer in the selection of the operating point for the unlocking of the closures.

The foregoing object has been achieved according to the present invention by providing only automatic-ejection snap-action closures which can be released via a motorized actuating drive, and the actuating drives being actuated via activation of a switch arrangement in order to release the closures. In contrast to known folding-top closures which are locked and unlocked via a motorized actuating drive and are hence of complex construction, as shown, for example, in German Patent 3,708,095, the actuating drives of the present invention provided serve exclusively for releasing the snap-action closure associated therewith. This is important because, as a result, the character of a manually operable folding top is retained. In addition, its actuating force need only be sufficient for the release operation, allowing compact actuators to be used for the actuating drive. Such actuators are used, for example, in central locking systems for the motorized changeover of the security condition of vehicle locks and are therefore manufactured economically in large batch quantities.

Since the snap-action closures eject the closure lug, engaging therein, of the mating component during the release operation, the fabric-holding hoop and the folding-top compartment lid jump up in corresponding fashion, whereupon they can be easily grasped due to the distance therebetween and their distance from the rim of the folding-top compartment.

Ease of operation is made further possible by automatic actuation of the switching device in which a sensor of the switching device can sense a component moved in the first phase of the opening of the folding top. The switching device is preferably actuated at as early a stage as the process of unlocking the roof cap and brings about closure release almost without a time delay.

In order to be able to use the on-board electrical system, present in any case in vehicles, as a transmission system, it is particularly advantageous to release the snap-action closures via electric-motor actuating drives which are activated via one or more electric switches. The actuating drive is expediently provided with an extendable and retractable driving rod which interacts as a tappet with the release mechanism. Such actuating drives, which are known per se, are distinguished by the simple construction of their housing and can therefore be accommodated without problems even in an installation space of little depth.

The flat actuating drive can also advantageously be arranged next to a compact pivoted-latch closure of a type also known per se, interacting with the latter via a release mechanism. A release lever of the release mechanism, which lever can be subjected to shock loading by the driving rod, can advantageously be arranged with a pendular motion between the actuating drive and the closure housing. It thereby is possible to use the interspace for the pendular oscillation of the release lever. The lever length of the release lever can here be dimensioned such that the overall height of the arrangement, as a whole, is at least not significantly increased thereby. A connecting rod passing through the side wall of the closure housing can be guided in a simple manner such that the overall height of the arrangement, as a whole, is not influenced in any way. This connecting rod, which preferably comprises a flexurally stiff metal wire, is furthermore distinguished by a low intrinsic weight and favorable manufacturing costs.

The connecting rod guided in sliding manner above the pawl is expediently engaged around by a driving hook of the pawl. The hook is supported axially on the connecting rod only in the direction of the releasing advance. A U-shaped intermediate bend in the connecting rod itself can then be used for axial support. In order to make possible the articulation of the connecting rod on the release lever at a sufficient distance, in terms of moment, from its oscillation axis, the articulated end region of the connecting rod is preferably offset in an appropriate manner.

By virtue of the special configuration of the release mechanism, a known type of actuating drive can be, in addition, combined in a simple and economical manner with a known, structurally unaltered snap-action closure. Due to the standardization effects possible as a result, the snap-action closure releasable via the electric-motor actuating drive can be constructed relatively economically.

BRIEF DESCRIPTION OF THE DRAWINGS

These and other objects, features and advantages of the present invention will become more apparent from the following detailed description of a currently preferred embodiment when taken in conjunction with the accompanying drawings wherein:

FIG. 4 is a vertical sectional view similar to FIG. 3 but with the fabric-holding hoop unlocked.

DETAILED DESCRIPTION OF THE DRAWINGS

Figure 1:
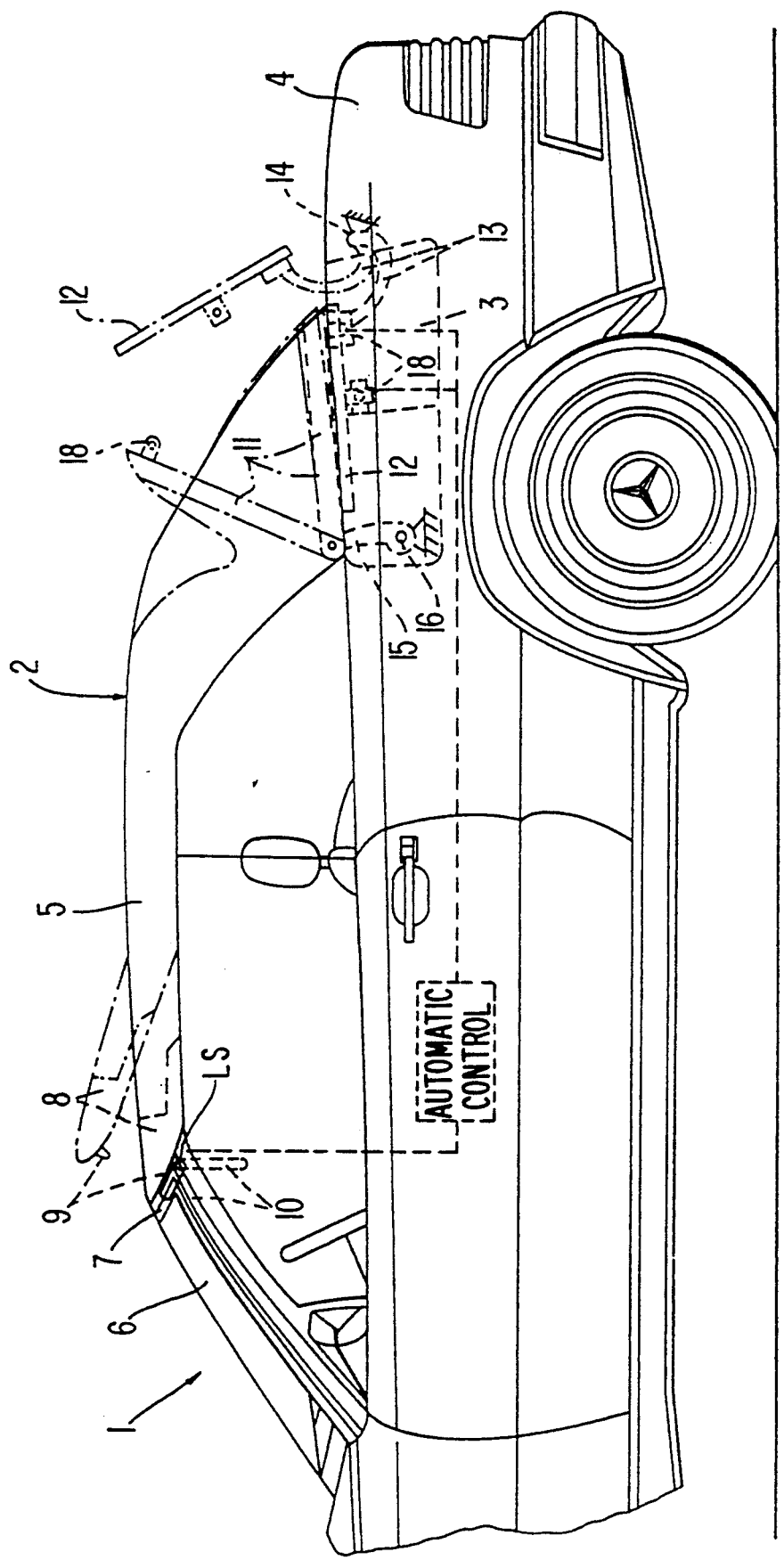
FIG. 1 is a partial view of a convertible vehicle with the folding top of the present invention in the closed position.

Referring now to FIG. 1, a convertible 1 is equipped with a folding top 2 which, when folded up, is retracted in a folding-top compartment 3 of the body 4. The compartment 3 is located behind the passenger compartment. The folding top 2 comprises, in a generally conventional manner, a supporting folding-top structure, over which a folding-top covering 5 of textile material is stretched. When closed, the front end of the top 2 is connected with a tight seal to a frame profile 7 extending above the windscreen 6. To achieve this, a roof cap 8 of the top 2, from the underside of which project two closure lugs 9, rests on the frame profile 7. The closure lugs 9 are each locked in an associated pivoted-latch closure. The construction of both of these pivoted-latch closures (not shown for clarity sake) is one which can be locked and unlocked by an advance rotation of an operating disc, with a hand lever 10 being provided for the manual rotary actuation of the operating disc. The operating principle of pivoted-latch closures of the above described kind is discussed in German Patent 3,708,095 and is therefore not explained in greater detail.

Figure 2:
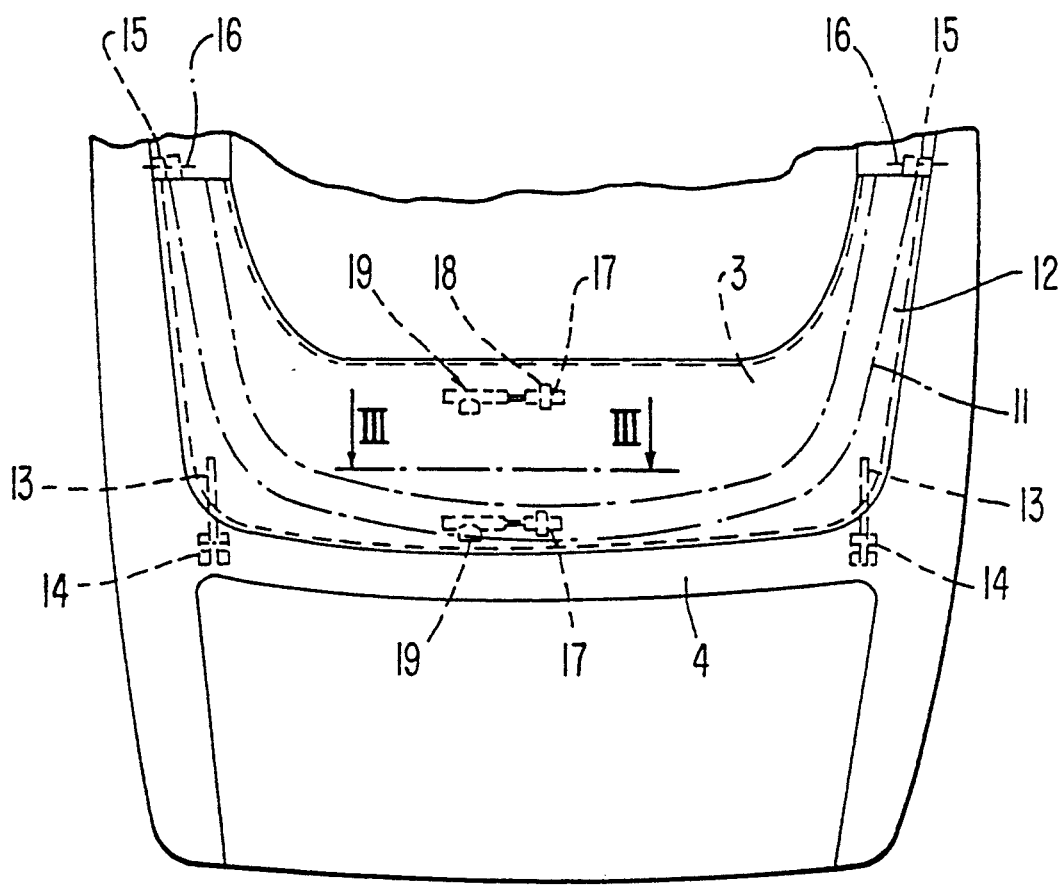
FIG. 2 is a partial plan view of the folding-top compartment with the folding top of the present invention in the lowered position.

To unlock the front folding-top closures, the hand lever 10 can, as indicated by broken lines in FIG. 1, be swivelled out of a horizontal rest position into a vertical unlocking position, and swivelled back into its rest position for the purpose of locking. The rear bottom end of the folding top 2 is formed by a U-shaped fabric-holding hoop 11, as seen in FIG. 2, which, with the top 2 closed, rests with a tight seal on the closed folding-top compartment lid 12, which covers the likewise U-shaped entry opening of the folding-top compartment 3. The folding-top compartment lid 12 is attached to the body 4 behind the folding-top compartment 3 via two laterally arranged hinge levers 13. As can be seen in FIG. 2, the hinge pin of the associated hinges 14 extends transversely to the longitudinal center plane of the vehicle, thereby making it possible to swivel the folding-top compartment lid 12 up and back about a horizontal transverse axis of the vehicle.

The fabric-holding hoop 11 is attached to the main bow of the folding-top structure so as to move in the opposite direction to the folding-top compartment lid 12. For this purpose, the front ends of its lateral limbs are articulated on the associated folding-top pillar 15 of the main bow. Below this articulation, the folding-top pillars 15 are articulated in the front end region of the folding-top compartment 3; this articulation represents the main bearing 16 about which the entire folding-top structure can be swivelled. The folding-top pillars 15 are connected to the roof cap 8 in a known manner via two-part lateral roof frames and are positively controlled in their movement via a plurality of parallelogram linkages. With the folding-top compartment lid 12 open and the front part of the roof raised, the folding top 2 can be retracted into the folding-top compartment 3 in a simple manner by swivelling the main bow into the folding-top compartment. The folding-top structure thereby is folded away automatically into stowed position. After its closure of the folding-top compartment lid 12, the folding-top structure is thus accommodated such that it cannot be seen from outside.

A closure arrangement is provided for holding shut the folding-top compartment lid 12, which is supported on a bearing rim of the folding-top compartment 3 via an elastomeric hollow profile, and also for holding down the fabric-holding hoop 11 on the folding-top compartment lid 12 counter to the force of a further seal. This closure arrangement comprises two snap-action closures 17 of identical configuration arranged spaced apart one behind the other in the longitudinal center plane of the convertible 1. The front closure of these closures 17 is mounted on the forward-facing boundary wall of the folding-top compartment 3, and the rear closure 17 is secured on the underside of the folding-top compartment lid 12 and passes through the folding-top compartment lid 12. Two closure lugs 18 are associated with the two-snap action closures 17. Each lug 18 is of fork-shaped configuration, projecting from the underside of the folding-top compartment lid 12 and the fabric-holding hoop 11. When the folding-top compartment lid 12 is closed or the fabric-holding hoop 11 folded down, the closure lugs 18 fall into the associated snap-action closure 17 and, given sufficient pressure, lock the folding-top compartment lid 12 to the folding-top compartment 3 and the fabric-holding hoop 11 to the folding-top compartment lid 12.

In order to simplify operation when opening the folding top 2, the two self-disengaging snap-action closures 17 can each be released by an associated actuating drive 19 with an electric motor. The actuating drive 19 is remote-controlled via an electric switching device formed by two microswitches arranged in the front folding-top closures LS of the type shown in above-mentioned German Patent 3,708,095 (one of which is shown) to sense the looking condition of the closure. Shortly before the front folding-top closures have been completely unlocked, the microswitches are positively actuated mechanically by the pressure of a control component. Only when the microswitches of both folding-top closures have been positively actuated are the electric motors provided with a current pulse, allocated by an interposed electronic control unit, sufficient for one actuating cycle of the actuating drives 19 as shown schematically in FIG. 1. The switching logic is intended reliably to prevent an unwanted release of the snap-action closures 17 while the convertible 1 is travelling. If the snap-action closures 17 were activated via only one of the two front folding-top closures, an unwanted release process could occur, for example due to playful operation of the corresponding hand lever 10.

When the snap-action closures 17 are released simultaneously, only the closure lug 18 of the fabric-holding hoop 11 is ejected completely from its snap-action closure 17, whereas the folding-top compartment lid 12 can only jump up as far as the fabric-holding hoop 11 covering it permits. However, as soon as the fabric-holding hoop 11 is swivelled up further in order to permit the folding-top compartment lid 12 to be swivelled up in the opposite direction during the process of lowering the folding top 2, the constraint is removed, as a result of which the closure lug 18 is also ejected completely from its snap-action closure 17 arranged on the folding-top compartment 3.

Figure 3:
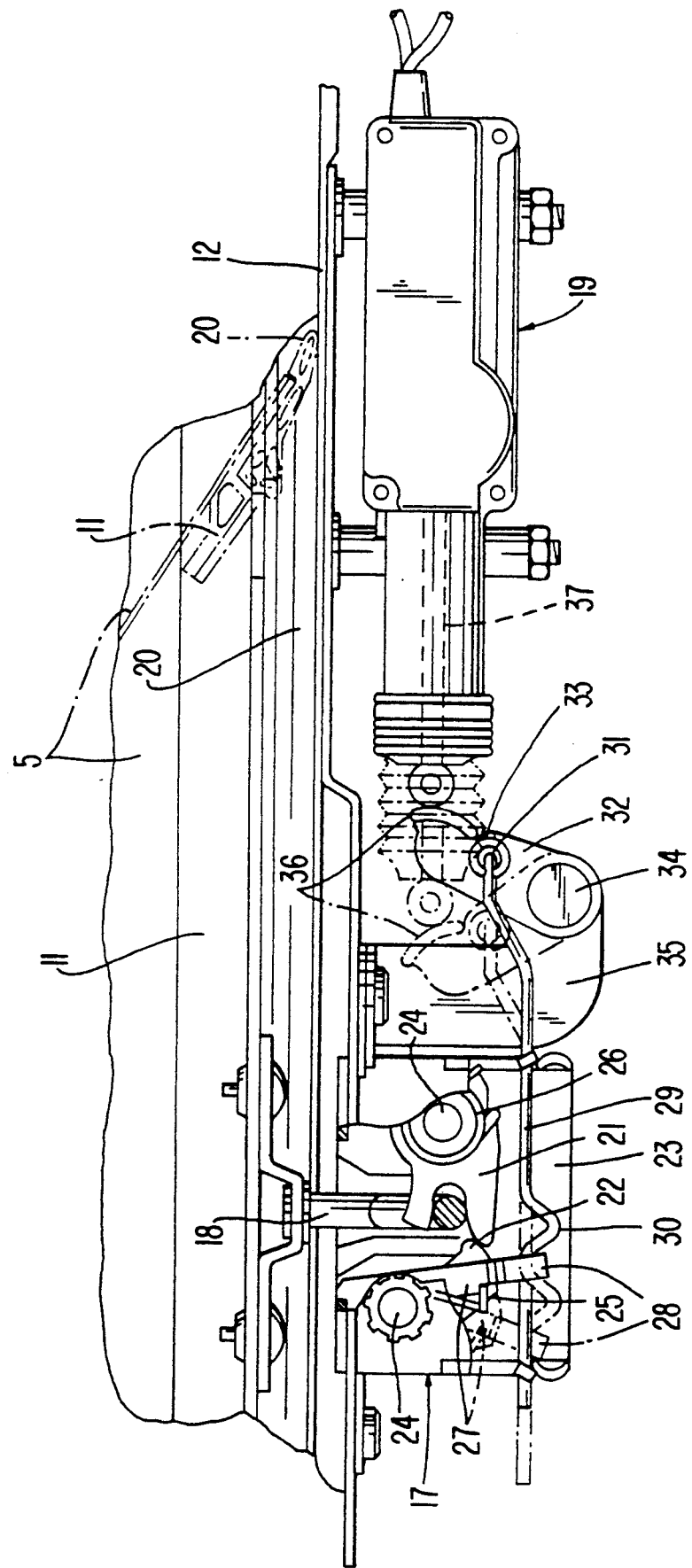
FIG. 3 is a vertical sectional view along line III—III of FIG. 2 with the fabric-holding hoop locked.

FIG. 3 shows the arrangement of the snap-action closure 17, releasable by an electric motor, on the underside of the folding-top compartment lid 12. The fabric-holding hoop 11 is locked in the position in which it rests on the folding-top compartment lid 12. In order to ensure a tight seal of the fabric-holding hoop 11 against the upper side of the folding-top compartment lid 12, a sealing lip 20 projects all the way round from the fabric-holding hoop 11. The lip 20 is supported on the folding-top compartment lid 12 and is under resilient prestress. The fabric-holding hoop 11 is held down counter to this prestressing force and the tension forces of the folding-top covering 5 by the single closure lug 18 which is screwed to the underside of the fabric-holding hoop 11 and, is itself locked in the snap-action closure 17.

The main components of the snap-action closure 17, which is configured as a pivoted-latch closure, are a forked pivoted latch 21 and a pawl 22 which are mounted opposite one another in the same swivelling plane in a narrow, box-shaped closure housing 23. Solid clinch bolts 24 are provided to give firm support. In the central region between the clinch bolts 24, the closure housing 23 is expanded by widened boundary walls which surround the closure lug 18 engaging transversely in the closure housing 23. To provide axial support for the closure lug 18, the fork of the forked pivoted latch 21, which is held in its blocking position by the pawl 22, engages around the central limb of the closure lug 18. To ensure that the latch 21 is held in its blocking position, a blocking nose at the end of the pawl 22 interacts in a manner which blocks swivelling with an oblique front end of that limb of the forked pivoted latch 21 which lays below the closure lug 18. To ensure that the blocking position is firmly fixed, the pawl 22 is loaded in the clockwise direction by a leg spring 25 which is supported on the closure housing 23. The forked pivoted latch 21 is spring-loaded in the opposite direction by a further leg spring 26 which is supported on the closure housing 23 and by which the forked pivoted latch 21 is stressed to swivel in the clockwise direction. Below the swivelling range of the pawl 22 in the downwardly open closure housing 23 there is a free space into which projects a lever arm 27 connected immovably to the pawl 22. An end region of this lever arm 27 is bent through about 180° to form a U-shaped driving hook 28. This driving hook 28 engages around a transmission device in the form of a connecting rod 29 which passes longitudinally through the closure housing 23, being guided in a sliding manner with circumferential play in its penetration of the two side walls of the closure housing 23. Considered over its entire length, the coupling rod 29 guided in a horizontally sliding manner is predominantly straight and has a cylindrical wire cross-section.

In order to allow the pawl 22 to be swivelled counter to its spring loading by the axial advance of the connecting rod 29, the connecting rod 29 is provided with an intermediate bend 30 of V-shaped curvature which is situated directly next to the driving hook 28 and provides axial support in one direction. That longitudinal region of the connecting rod 29 which projects from the right-hand side wall of the closure housing 23 initially continues in a straight line and then merges with an upward bend into an offset end region. The outermost end of this end region of the connecting rod 29 is angled transversely to the plane of the paper and passes through a bearing hole 31 cut out of a release lever 32. In addition to providing articulation, the engagement of the connecting rod 29 in the release lever 32, which is secured by, for example, a plastic clip 33, prevents rotation of the connecting rod 29.

At a vertical distance from the bearing hole 31, approximately at the height of the lower edge of the closure housing 23, the release lever 32 is suspended pendulum-fashion, via a hinge joint 34, on a holder 35 which is screwed to the underside of the folding-top compartment lid 12 next to the narrow side wall of the closure housing 23. By virtue of this suspension, the release lever 32 is mounted, with the ability to move pendulum-fashion, parallel to the swivelling plane of the forked pivoted latch 21, being held via the connecting rod 29 in a starting position at a distance from the closure housing 23. One end of the release lever 32, which projects above the articulation of the connecting rod 29, is provided with a bent impact plate 36 which is angled transversely to the swivelling plane of the release lever 32. Resting against the convex side of the impact plate 36 is an annular tappet end of a driving rod 37 which projects out of a tubular housing of the actuating drive 19. The tappet end can be extended by an electric motor parallel to the connecting rod 29 into an outer end position and then retracted with a reversal in direction back into its inner end position. If the actuating drive 19 receives a current pulse required for this actuating cycle, the snap-action closure 18 is released via the advance of the driving rod and the interposed release mechanism.

As indicated by broken lines in FIG. 3., the release lever 32 is swivelled closer to the side wall of the closure housing 23 by the extending driving rod 37, and the connecting rod 29 articulated on the housing 23 thereby undergoes an axial advance in the same direction. Due to the axial support of the intermediate bend 30 against the driving hook 28, the pawl 22 is thereby simultaneously swivelled in the clockwise direction. As soon as the swivelling-away pawl 22 no longer blocks the swivelling of the forked pivoted latch 21, the forked pivoted latch 21 snaps into its release position due to the force of the leg spring 26 and, in the process, ejects the closure lug 18 out of the closure housing 23. During the subsequent retraction of the driving rod 37, the pawl 22 likewise swings back, under its spring loading, into its starting position, in which it is held by virtue of the fact that it strikes against the closure housing 23. The forked pivoted latch 21 is also fixed in its release position by virtue of the fact that it runs up against a stop surface of the closure housing 23.

As seen in FIG. 4, the closure lug 18 of the unlocked fabric-holding hoop 11 now rests loosely on the forked end of the forked pivoted latch 21, as a result of which it no longer hinders the upward swivelling of the fabric-holding hoop 11. The distance between the fabric-holding hoop 11 and the folding-top compartment lid 12 here almost corresponds to the length of the closure lug 18 and is hence sufficient to allow the fabric-holding hoop 11 to be grasped easily. Because the connecting rod 29 is supported axially against the driving hook 28 via the intermediate bend 30 only in the direction of its releasing advance, a floating mechanism is obtained in the opposite direction, allowing mechanical locking of the fabric-holding hoop 11 with the connecting rod 29 held in the starting position.

When the fabric-holding hoop 11 is swivelled down onto the closed folding-top compartment lid 12, the closure lug 18 runs into the forked pivoted latch 21, as seen in FIG. 4, and swivels the forked pivoted latch 21 in the counterclockwise direction, given appropriate pressure to overcome the leg spring 26. In the last phase of the entry movement of the closure lug 18, the end of the forked pivoted latch 21 runs into the opposite narrow side of the pawl 22. The pawl 22 is swivelled along with it as well counter to its spring loading and hence permits the end of the pivoted closure to be passed. As soon as the forked pivoted closure 21 has reached its end position, the pawl 22 snaps back into its blocking position under the spring force of its leg spring 25. As a result, the forked pivoted latch 21 is again blocked against swivelling. The fabric-holding hoop 11, which is thus locked, can now only be released again by activating the actuating drive 19.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A manually operable vehicle folding top having a folding-top compartment of a vehicle covered by a folding-top compartment lid with a folded stowed position of the top in the folding-top compartment covered by the folding-top compartment lid and with an unfolded use position of the top in which the folding-top covering is stretched between a roof cap on a front end of the folding-top and a fabric-holding hoop at a rear end of the folding-top, and a closure arrangement comprising a plurality of closures configured to be unlocked with remote control from the vehicle interior and such that the folding-top compartment lid is held closed and the fabric-holding hoop is held down in the position in which it rests on the folding-top compartment lid, said closures being constituted solely by automatic-ejection snap-action closures configured and arranged to be released via actuating drives actuated via a switching mechanism, wherein means is provided for automatically controlling the actuation of the switching mechanism in a first phase of the opening of the folding top.

2. The folding top according to claim 1, wherein the switching mechanism is configured to be positively actuated during the unlocking process of the roof cap.

3. The folding top according to claim 1, wherein the actuating drives are electric motor actuated drives actuated by the associated switching mechanism and are arranged to release the snap-action closures.

4. The folding top according to claim 3, wherein the actuating drive associated with a snap-action closure having a release mechanism comprises an extendable and retractable driving rod, an end of which interacts as a tappet with the release mechanism of the snap-action closure to release the closure.

5. The folding top according to claim 4, wherein the release mechanism has a transmission device, the snap-action closure comprises a pivoted-latch closure having a forked pivoted latch spring loaded in one direction and a pawl spring-loaded in an opposite direction, said latch and pawl being mounted opposite one another in a closure housing with complementary housing walls forming a box shape, with the forked pivoted latch and the pawl configured and arranged to have limited swivellability, the driving rod is arranged so as to run towards one of the side walls of the closure housing, and a side wall of the closure housing lays opposite the driving rod and is penetrated by the transmission device.

6. The folding top according to claim 5, wherein the release mechanism comprises a release lever arranged between the tappet end of the driving rod and an opposite side wall of the closure housing, said release lever being suspended pendulum-like such that a free end thereof is arranged to be swivelled closer to the side wall of the closure housing under shock loading by the tappet end of the driving rod, a connecting rod constitutes the transmission device and is articulated at one end at a distance, from an oscillation axis of the release lever, to form a movement arm and a longitudinal region of the connecting rod extends in the closure housing and is operatively connected via a floating mechanism to a lever arm of, the pawl.

7. The folding top according to claim 6, wherein the connecting rod is slidably guided, passing through both side walls of the closure housing, being engaged around outside the swivelling range of the pawl by a driving hook of the lever arm, and the driving hook is supported axially against the connecting rod only in the direction of the releasing advance of the said connecting rod..

8. The folding top according to claim 7, wherein an intermediate bend is provided in the connecting rod axially supporting the driving hook on the connecting rod.

9. The folding top according to claim 6, wherein an end region of the connecting rod which is articulated on the release lever is offset.

* * * * *